(12) United States Patent
Koo et al.

(10) Patent No.: US 9,161,278 B2
(45) Date of Patent: Oct. 13, 2015

(54) COMMUNICATING AN INDICATION RELATING TO IN-DEVICE COEXISTENCE INTERFERENCE

(71) Applicant: RESEARCH IN MOTION LIMITED, Waterloo (CA)

(72) Inventors: Changhoi Koo, Plano, TX (US); Rene Waraputra Purnadi, Irving, TX (US); Zhijun Cai, Euless, TX (US)

(73) Assignee: BlackBerry Limited, Waterloo, Ontario (CA)

(*) Notice: Subject to any disclaimer, the term of this patent is extended or adjusted under 35 U.S.C. 154(b) by 180 days.

(21) Appl. No.: 13/856,628

(22) Filed: Apr. 4, 2013

(65) Prior Publication Data

US 2014/0301361 A1    Oct. 9, 2014

(51) Int. Cl.
   *H04W 4/00* (2009.01)
   *H04W 36/20* (2009.01)
   *H04W 24/10* (2009.01)
   *H04W 88/06* (2009.01)

(52) U.S. Cl.
   CPC ............ *H04W 36/20* (2013.01); *H04W 4/00* (2013.01); *H04W 24/10* (2013.01); *H04W 88/06* (2013.01)

(58) Field of Classification Search
   CPC .............................. H04W 36/20; H04W 4/00
   USPC .......................................... 370/331; 455/63.1
   See application file for complete search history.

(56) References Cited

U.S. PATENT DOCUMENTS

| | | | |
|---|---|---|---|
| 8,547,867 B2 | 10/2013 | Koo | |
| 8,849,293 B2 | 9/2014 | Koo et al. | |
| 2008/0205365 A1 | 8/2008 | Russell et al. | |
| 2011/0268024 A1 | 11/2011 | Jamp et al. | |
| 2012/0069766 A1* | 3/2012 | Fu et al. | 370/252 |
| 2012/0082077 A1 | 4/2012 | Zhang et al. | |
| 2012/0082140 A1 | 4/2012 | Lin et al. | |
| 2012/0087341 A1 | 4/2012 | Jang et al. | |
| 2012/0164948 A1 | 6/2012 | Narasimha et al. | |
| 2012/0170557 A1 | 7/2012 | Tsfati et al. | |
| 2012/0176923 A1 | 7/2012 | Hsu et al. | |
| 2012/0182896 A1 | 7/2012 | Jang et al. | |
| 2012/0195291 A1 | 8/2012 | Kuo | |
| 2012/0207032 A1 | 8/2012 | Chen et al. | |
| 2012/0207040 A1 | 8/2012 | Comsa et al. | |
| 2012/0314598 A1 | 12/2012 | Sadek et al. | |
| 2013/0303214 A1* | 11/2013 | Ahmadi | 455/501 |
| 2014/0036745 A1 | 2/2014 | Koo et al. | |
| 2014/0141824 A1 | 5/2014 | Kim et al. | |

(Continued)

FOREIGN PATENT DOCUMENTS

WO    2012021879    2/2012

OTHER PUBLICATIONS

Zhenping Hu et al., Technology Updates on LTE Advanced, Interference Avoidance for In-Device Coexistence in 3GPP LTE-Advanced: Challenges and Solutions, IEEE Communications Magazine, Nov. 2012 (8 pages).

(Continued)

*Primary Examiner* — Sai-Ming Chan
(74) *Attorney, Agent, or Firm* — Trop Pruner & Hu, P.C.

(57) ABSTRACT

A user equipment (UE) sends, to a wireless access network node, an indication for indicating whether a transmission component causing in-device coexistence (IDC) interference in the UE is active or inactive.

21 Claims, 4 Drawing Sheets

(56) References Cited

U.S. PATENT DOCUMENTS

2014/0141825 A1   5/2014   Koo et al.
2014/0198672 A1   7/2014   Koo et al.
2015/0049705 A1*  2/2015   Feuersaenger et al. ....... 370/329

OTHER PUBLICATIONS

3GPP TSG-RAN2 Meeting #71, Madrid, Spain, R2-104880, Agenda Item: 7.6, Source: LG Electronics Inc., Title: Possible Solutions for In-device Interference Avoidance, Aug. 23-27, 2010 (2 pages).
3GPP TSG RAN WG2 Meeting #71bis, Xi'an, China, R2-105336, Source: CATT, Title: FDM-based Approach for In-device Coexistence Interference, Agenda Item: 7.8, Oct. 11-15, 2010 (2 pages).
3GPP TSG-RAN WG2 Meeting #77b, Jeju, Korea, R2-121281, Agenda Item: 7.6.2.2, Source: Research in Motion UK Limited, Title: Signaling Procedures for IDC operation, Mar. 26-30, 2012 (6 pages).
3GPP TSG-RAN WG2 Meeting #77b, Jeju, Korea, R2-121286, Agenda Item: 7.6.2.1, Source: Research in Motion UK Limited, Title: Potential Interference for IDC operation, Mar. 26-30, 2012 (4 pages).
3GPP TSG-RAN WG2 Meeting #79, Qingdao, China, R2-123534, Agenda Item: 7.6.2, Source: Huawei (Rapporteur), Title: Report of email discussion [78#49] LTE/IDC: IDC indication, Aug. 13-14, 2012 (42 pages).
European Patent Office, Notification of Transmittal of the International Search Report and the Written Opinion of the International Searching Authority, or the Declaration mailed Jun. 30, 2014 (13 pages).
3GPP TS 36.300 V11.5.0, Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11) (Mar. 2013) (209 pages).
3GPP TS 36.331 V11.3.0, Technical Specification 3rd Generation Partnership Project; Technical Specification Group Radio Access Network; Evolved Universal Terrestrial Radio Access (E-UTRA); Radio Resource Control (RRC); Protocol specification (Release 11) (Mar. 2013) (344 pages).
3GPP TR 36.816 v1.3.0 1, Technical Report 3rd Generation Partnership Project; Technical Specification Group Radio Access Networks; Evolved Universal Terrestrial Radio Access (E-UTRA); Study on signalling and procedure for interference avoidance for in-device coexistence (Release 10) (May 2011) (42 pages).
3GPP TR 36.816 V11.2.0,Technical Report 3rd Generation Partnership Project; Technical Specification Group Radio Access Network; Evolved Universal Terrestrial Radio Access (E-UTRA); Study on signalling and procedure for interference avoidance for in-device coexistence (Release 11) (Dec. 2011) (44 pages).
3GPP TSG-RAN WG4 Meeting #54 R4-100706, San Francisco, US, Feb. 22-26, 2010, Agenda item: 7.1.2, Source: CMCC, Title: Coexistence studies between LTE and WLAN, Document for: Discussion (7 pages).
3GPP TSG-RAN WG4 Meeting #54 R4-100707, San Francisco, US, Feb. 22-26, 2010, Agenda item: 7.1.2, Source: CMCC, Title: Addition of LTE UE RF requirements for coexistence with WLAN, Document for: Discussion (6 pages).
3GPP TSG-RAN-WG4 Meeting #55 R4-102268, Montreal, Canada, May 10-14, 2010, Title: LS on in-device coexistence interference, Release: 3GPP Release 10, Work Item: Source: TSG-RAN WG4 (1 page).

\* cited by examiner ns provided
COMMUNICATING AN INDICATION RELATING TO IN-DEVICE COEXISTENCE INTERFERENCE

BACKGROUND

A user equipment (UE) can include multiple wireless interfaces (e.g. wireless interfaces capable of performing radio frequency (RF) communications). The presence of multiple wireless interfaces allows the UE to communicate content using any of several different communications links. Examples of wireless interfaces that may be present in a UE include a wireless interface to communicate in a Long Term Evolution (LTE) frequency band, a wireless interface to communicate in an Industrial Scientific Medical (ISM) frequency band, or a wireless interface to communicate in a Global Navigation Satellite System (GNSS) frequency band.

BRIEF DESCRIPTION OF THE DRAWINGS

Some embodiments are described with respect to the following figures.

DETAILED DESCRIPTION

Figure 1:
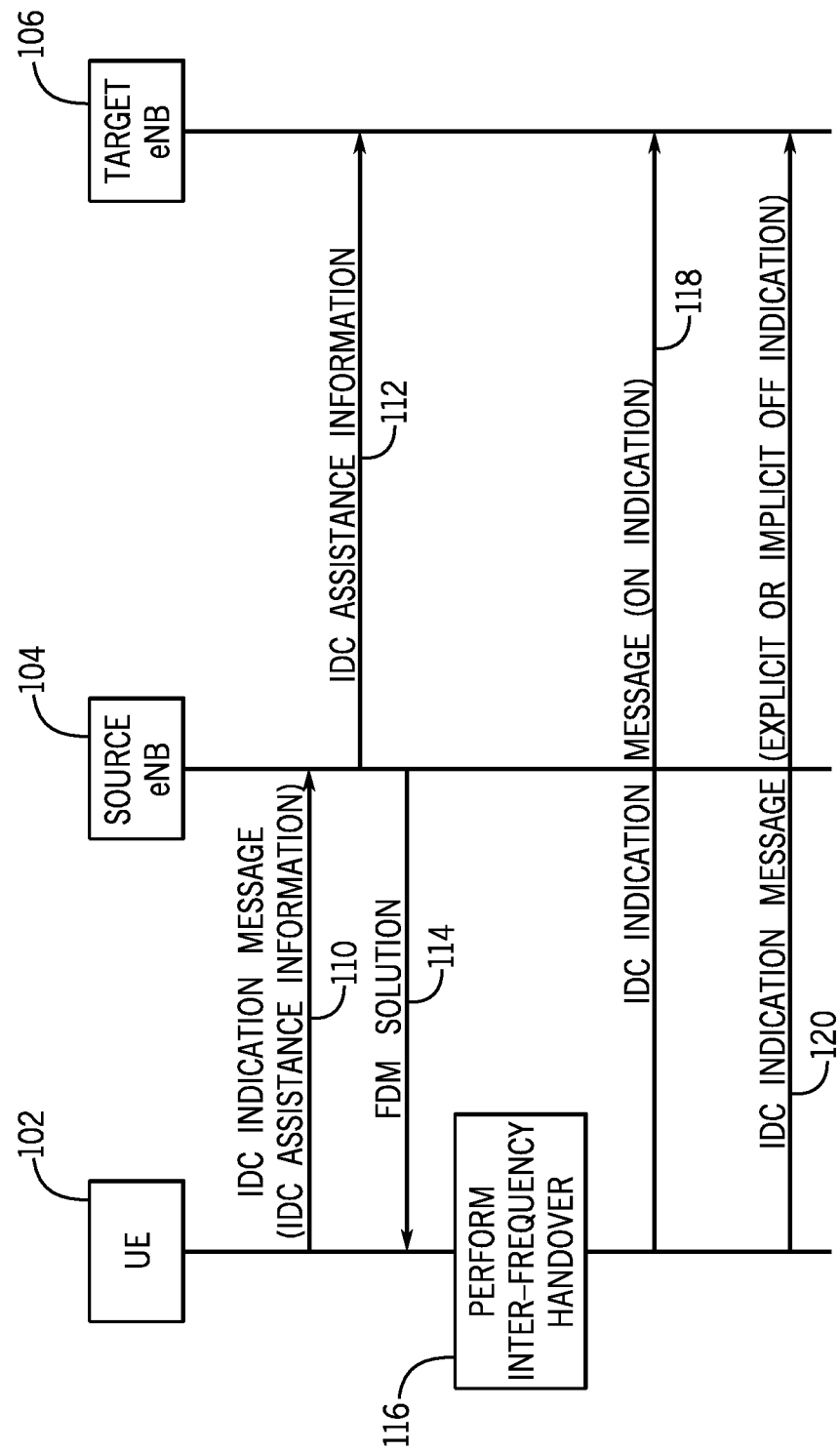
FIG. 1 is a message flow diagram of a process relating to in-device coexistence (IDC) interference management, in accordance with some implementations.

The presence of multiple types of wireless interfaces (that are capable of performing wireless communications according to different wireless technologies) in a user equipment (UE) can result in interference between the different wireless interfaces. In some implementations, the different wireless interfaces may operate concurrently in adjacent or overlapping radio frequency (RF) bands. In the ensuing discussion, a wireless interface that communicates in an RF band is also referred to as a radio interface. Note that although reference is made to radio interfaces in the ensuing discussion, it is noted that techniques or mechanisms can also be applied to other types of wireless interfaces, such as interfaces that communicate at frequencies outside the RF bands, interfaces that communicate optically (e.g. infrared interfaces), interfaces that communicate using acoustic signaling, and so forth.

If multiple radio interfaces in a UE are able to operate concurrently in adjacent or overlapping frequency bands, then signal transmission in a first frequency band by one radio interface in the UE can interfere with signal reception in a second frequency band by another radio interface in the same UE, particularly where the radio interfaces are in relatively close proximity to each other in the UE. Such interference can be referred to as in-device coexistence (IDC) interference. In some examples, IDC interference can occur between a radio interface operating according to the Long Term Evolution (LTE) technology and another radio interface operating according to the Industrial, Scientific and Medical (ISM) technology.

The LTE technology is defined by LTE standards provided by the Third Generation Partnership Project (3GPP). The LTE standards include the initial LTE standards or the LTE-Advanced standards. The LTE standards are also referred to as the Evolved Universal Terrestrial Radio Access (E-UTRA) standards.

The frequency band for the ISM technology is reserved for use of certain types of communications, such as Bluetooth communications, WiFi communications, and so forth. The ISM technology is defined by the International Telecommunication Union (ITU).

IDC interference can also exist between an LTE radio interface and another radio interface that performs Global Navigation Satellite Systems (GNSS) communications. An example of a radio interface that performs GNSS communications is a radio interface in a Global Positioning System (GPS) receiver.

Although reference is made to IDC interference between specific example radio interfaces, it is noted that techniques or mechanisms according to some implementations are applicable to address IDC interference between other types of wireless technologies. More generally, IDC interference occurs when signal transmission by a transmission component (referred to as the "interfering transmission component") in the UE interferes with signal reception by a reception component in the UE.

In response to detection of IDC interference in a UE that satisfies a triggering condition, the UE can send an IDC indication message (referred to as the InDeviceCoexIndication message by the 3GPP standards) to a corresponding wireless access network node. In the context of LTE, the wireless access network node can be an enhanced Node B (eNB). Generally, an "IDC indication" includes any information that relates to IDC interference, which can be provided in any of various possible messages that can be sent from a UE to the corresponding wireless access network node. A message containing an IDC indication is referred to as an IDC indication message.

In the ensuing discussion, reference is made to eNBs used in an E-UTRA network (also referred to as an LTE network). In other implementations, other types of wireless access network nodes may be employed, where a wireless access network node is a node capable of wirelessly communicating with UEs within the coverage area of the wireless access network node.

In some implementations, the triggering condition for triggering transmission of an IDC indication can include a specification of an IDC interference threshold. An IDC interference threshold can refer to a threshold that is used for mitigating (reducing or removing) IDC interference. If IDC interference exceeds the IDC interference threshold, then an IDC indication message may be triggered for transmission from the UE to the wireless access network node, if the UE is unable to resolve the IDC interference itself and is seeking network intervention.

An eNB can send an IDC solution to the UE in response to an IDC indication message from the UE that indicates presence of IDC interference. The IDC solution causes the UE to modify its wireless communication behavior to remove or reduce the IDC interference. In some examples, the wireless access network node can select one of several IDC solutions to allocate to the UE in response to an IDC indication. As examples, the IDC solutions can include a Frequency Division Multiplexing (FDM) solution or a Time Division Multiplexing (TDM) solution. As other examples, the IDC solutions can further include a power control solution.

A TDM solution generally involves modifying a time pattern associated with communication of a particular radio interface in the UE to cause time separation between transmissions at a first radio interface and receptions at a second radio interface. There can be several types of TDM solutions, including, as examples, the following: a TDM-DRX (Discontinuous Reception) solution, a TDM-HARQ (Hybrid Automatic Repeat Request) solution, and a TDM-gap solution.

A power control solution can be used to reduce power reduction at the UE to mitigate IDC interference.

An FDM solution generally involves modifying the communication frequency of a particular radio interface in the UE to cause frequency separation between transmissions at a first radio interface and receptions at a second radio interface. Modifying the communication frequency of the particular radio interface can be accomplished by performing handover of a communications session of the particular radio interface from a first radio carrier (at a first frequency) to a second radio carrier (at a second, different frequency). The handover can be an intra-eNB handover (handover of the UE across the different frequencies supported by one eNB), or an inter-eNB handover (handover of the UE between different eNBs).

Alternatively, in an arrangement where carrier aggregation is employed, an FDM solution can remove secondary cells from a set of serving cells for the UE. Carrier aggregation involves the use of multiple component carriers for communicating data with the UE, where one component carrier is used as a primary carrier, while the remaining carrier(s) of the carrier aggregation is (are) used as secondary carrier(s). A cell serving the UE on a primary carrier can be used as a primary cell, while a cell serving the UE on a secondary carrier can be used as a secondary cell. Removing the secondary cell(s) that is (are) subject to IDC interference from the set of the serving cells means that the UE would no longer employ the carrier frequency (or frequencies) that are being interfered with.

To assist the eNB in selecting an appropriate solution, various assistance information (for the FDM and TDM solutions and possibly also for another solution such as the power control solution) can be sent in an IDC indication message from the UE to the eNB. The IDC assistance information can contain a list of carriers that suffer from ongoing IDC interference, the direction of the interference, TDM patterns (e.g. on-time, off-time, and duration cycle) or parameters to enable the provision of a TDM solution, and other information.

In the context of an inter-eNB handover of the UE from a source eNB to a target eNB, certain IDC assistance information can be transferred from the source eNB to the target eNB as part of the handover procedure. When the source eNB completes a handover, the source eNB can transfer IDC assistance information relating to the UE to the target eNB. The assistance information for the FDM solution (referred to as "FDM assistance information") transferred from the source eNB to the target eNB can include a set of one or more unavailable frequencies (also referred to as a set of one or more unusable frequencies) for the UE. The one or more unavailable (or unusable) frequencies include one or more frequencies identified by the source eNB as potentially being subject to IDC interference.

Once the UE is handed over to the target eNB, the UE can send an IDC indication message to the target eNB. This IDC indication message can be an IDC indication message with IDC assistance information (for the scenario where IDC interference is still present), or an IDC indication message with an IDC over indication if the UE no longer experiences IDC interference after the handover. The IDC over indication indicates that the IDC indication message does not include a set of one or more unavailable frequencies.

If the target eNB determines that IDC interference is still present at the UE, such as due to receipt of the IDC indication message containing IDC assistance information from the UE, the target eNB can take action to avoid handing over the UE to one or more problematic frequencies that may be subject to IDC interference, to avoid a ping-pong issue during handover. The problematic frequencies include the frequencies identified in the set of one or more unavailable frequencies (provided from the source eNB to the target eNB), and a frequency of the source eNB used by the UE prior to the handover.

After handover from the source eNB to the target eNB (where the handover was triggered by IDC interference and not by mobility of the UE), the UE may perform measurements, such as measurements of subframes that are not affected by the interfering transmission component. A subframe is a frame structure having a specified time length used to carry signaling or data; a subframe is part of a frame that has multiple subframes. Based on the measurements, the UE may detect the frequency of the source eNB as providing the greatest signal strength because the handover was performed due to IDC interference and not mobility (e.g. the UE may have remained in the coverage area of the source eNB, but was handed over to the target eNB to mitigate IDC interference). Thus, the frequency of the source eNB used by the UE prior to the handover can be one of the candidate frequencies to which the target eNB can hand over the UE.

However, if the target eNB were to hand over the UE back to one of the problematic frequencies (the frequency of the source eNB used by the UE prior to handover, or a frequency from the set of one or more unavailable frequencies), then IDC interference may recur, which results in the ping-pong issue. The ping-pong issue thus involves performing an inter-eNB handover to avoid IDC interference, but during or after the handover, the target eNB causes the UE to be transferred to a problematic frequency, which leads to recurrence of IDC interference after the handover.

If an inter-eNB handover was performed as part of an FDM solution to resolve IDC interference, and the IDC interference is in fact resolved as a result of the inter-eNB handover, then the UE sends an IDC indication message with an IDC over indication. The IDC over indication is an indication to an eNB that the IDC interference is over (or has been resolved).

When the target eNB receives the IDC over indication, the target eNB may recognize that the UE no longer experiences IDC interference. As a result, the target eNB may perform a handover of the UE to a problematic frequency, which can be the frequency of the source eNB that was used by the UE that caused IDC interference prior to the handover, or a frequency from among the set of one or more unavailable frequencies. However, if the interfering transmission component in the UE (that caused the IDC interference) is still active, then handover of the UE back to a problematic frequency will cause recurrence of IDC interference (resulting in the ping-pong issue), even though the UE had sent the IDC over indication.

The interfering transmission component being active can refer to the interfering transmission component (e.g. a transmitter that transmits in the ISM or GNSS frequency band) being either (1) powered on, or (2) actively transmitting signaling or data. The interfering transmission component being inactive refers to the interfering transmission component being either (1) powered off, or (2) not transmitting signaling or data.

To address the foregoing issue, the target eNB may decide to not perform handover to any of the problematic frequencies, even if the target eNB were to receive an IDC indication message with an IDC over indication. However, the target eNB does not know how long the problematic frequencies will continue to potentially cause IDC interference, since the target eNB has no way of knowing whether the interfering transmission component has been deactivated (e.g. the interfering component is no longer actively transmitting signaling or data or has been powered off) in the UE. As a result, the target eNB may avoid handing over to the problematic frequencies even if the interfering transmission component at the UE has been disabled, which would exclude the use of certain frequencies for the UE that are now usable without causing IDC interference at the UE. This can reduce flexibility in performing communications with the UE.

In accordance with some embodiments, a new information element is provided to allow for a UE to provide an indication to an eNB regarding whether the interfering transmission component is active or inactive. In some implementations, the indication can be an On-Off field, where the On-Off field has a first value to indicate that the interfering transmission component is active, and a second value to indicate that the interfering transmission component is inactive.

In alternative implementations, the indication can be an On field, which is sent by the UE to the eNB if the interfering transmission component is active. However, in such alternative implementations, the UE does not send the On field if the interfering transmission component is inactive. Thus, lack of this On field (as well as lack of a set of one or more unavailable frequencies) in a message, such as an IDC indication message or other message, is an implicit indication that the interfering transmission component is inactive.

In some examples, the On-Off field is referred to as an ISM On-Off field. The ISM On-Off field can be set to the value "1" to indicate that the interfering transmission component is still active in the UE after handover. However, the ISM On-Off field can be set to the value "0" to indicate that the interfering transmission component has been turned off (or is inactive) after the handover.

In different implementations, the UE can use an ISM-On field, which if sent indicates that the interfering transmission component is still active in the UE after the handover.

The foregoing fields (On-Off field or On field) can be sent using any of the following messages:

(1) An existing IDC indication message with a new information element (ISM On-Off or ISM On).
(2) An existing uplink Radio Resource Control (RRC) message with new information element (e.g. ISM On-Off or ISM On). RRC messages are exchanged between a UE and an eNB to carry control plane signaling, such as to perform connection establishment or release, broadcast of system information, mobility procedures, and so forth. An existing RRC message is a message defined by current 3GPP standards. An RRC uplink message is an RRC message sent from the UE to the eNB.
(3) A new uplink RRC message, which can be an ISM On-Off indication message or ISM On indication message. A new RRC message is an RRC message that is not yet defined in current 3GPP standards.
(4) An existing Medium Access Control (MAC) control element (CE) that has a new information element (e.g. ISM On-Off or ISM On). A MAC CE is a message used by MAC protocol layers in the UE and eNB to perform channel access procedures. An existing MAC CE is a MAC CE defined by current 3GPP standards.
(5) A new MAC CE (e.g. ISM On-Off indication MAC CE or ISM On indication MAC CE). A new MAC CE is a MAC CE not yet defined by current 3GPP standards.

According to yet further alternative implementations, use of the On-Off field or On field can be omitted for indicating whether or not the interfering transmission component is active or inactive. Instead of sending an explicit indication in the form of the On-Off field or On field, the UE can instead delay the sending of an IDC indication message with the IDC over indication. As long as the IDC indication message with the IDC over indication is not received by an eNB, the eNB will assume that the interfering transmission component is still active.

UE Operation

FIG. 1 is a message flow diagram relating to IDC operation, according to some implementations. The message flow involves a UE 102, a source eNB 104, and a target eNB 106. Upon detecting IDC interference that satisfies a specified condition, the UE 102 sends (at 110) an IDC indication message to the source eNB 104, which is the eNB serving the UE 102 at this point. The IDC indication message contains IDC assistance information.

The source eNB 104 may decide to implement an FDM solution, which involves handing over the UE 102 to a different frequency, which can be the frequency of the target eNB 106. This handover is an inter-eNB handover.

The source eNB 104 sends (at 112) IDC assistance information to the target eNB 106, where the IDC assistance information can include a set of one or more unavailable frequencies (as discussed above). In addition, the source eNB 104 sends (at 114) the FDM solution to the UE 102, which takes action to perform (at 116) an inter-frequency handover procedure according to the FDM solution.

After completing the handover, one of several options (Option 1, Option 2, or Option 3) can be used for indicating whether or not the interfering transmission component is active or inactive.

In Option 1, the On-Off field is used. After completing the handover, and assuming that the IDC interference has been resolved by the inter-frequency handover, the UE 102 sends (at 118) an IDC indication message with the IDC over indication to the target eNB 106. If the interfering transmission component is still active, the IDC indication message sent at 118 can also include the On-Off field set to the first value to indicate that the interfering transmission component is active. It is noted that the IDC indication message sent at 118 may or may not include a set of one or more unavailable frequencies (which are frequencies that are potentially subject to IDC interference).

In other implementations, the On-Off field can be sent in a message other than an IDC indication message, as listed above. In further examples, instead of sending the On-Off field with the IDC over indication, the On-Off field can be sent in a separate IDC indication message or in another separate message.

After sending (at 118) the IDC indication message with On-Off field set to the first value to indicate that the interfering transmission component is active, the UE 102 may, in response to detecting that the interfering transmission component has been deactivated, subsequently send (at 120) another IDC indication message (or a different message) with the On-Off field set to the second value to indicate that the interfering transmission component is inactive. Note that the IDC indication message sent at 120 does not include a set of one or more unavailable frequencies.

The subsequent message (sent at 120) containing the On-Off field set to the second value may or may not be combined with an IDC indication message including IDC over indication. For example, a MAC CE can provide an alternative way to deliver the On-Off field set to the second value (to indicate that the interfering transmission component is inactive) with relatively low delay and reasonable robustness. Therefore, a new MAC CE for carrying the On-Off field set to the second value may be designed for this purpose.

In a different example, if, after completing the handover, the interfering transmission component has been deactivated (such that it is no longer actively transmitting signaling or data), then the IDC indication message sent at 118 can also include the On-Off field set to the second value to indicate that the interfering transmission component is inactive. In this case, the subsequent message (sent at 120) can be omitted.

In Option 2, instead of using the On-Off field, the On field is used. After completing the handover, if the interfering transmission component is still active, the UE 102 sends (at 118) the IDC indication message with the IDC over indication and the On field. In this case, the IDC indication message may or may not include a set of one or more unavailable frequencies. After sending (at 118) the IDC indication message with On field, if the UE 102 detects that the interfering transmission component is inactive, the UE 102 may subsequently send (at 120) an IDC indication message (or another message) without the On field and without a set of one or more unavailable frequencies. This message sent at 120 indicates that the interfering transmission component is inactive.

As a different example, after the handover, if the interfering transmission component is inactive, then the IDC indication message sent (at 118) does not include On field and a set of one or more unavailable frequencies. In this case, the message sent (at 120) can be omitted.

In Option 3, neither the On-Off field nor the On field of Option 1 or 2, respectively, is used. In Option 3, the UE 102 does not send an IDC indication message with IDC over indication upon completing the handover (at 116) if the interfering transmission component is still active in the UE 102. In such implementations, the UE 102 may withhold the transmission of an IDC indication message with the IDC over indication to the target eNB 106 until the interfering transmission component is deactivated.

In different examples, with any of the options discussed above, if IDC interference has not been successfully resolved with the inter-frequency handover performed (at 116), the UE 102 may send an IDC indication message with IDC assistance information to the target eNB 106 to request an IDC solution from the target eNB 106.

Although a UE does not normally resend the same IDC indication message to an eNB, the UE may send the same IDC indication message (previously sent to the source eNB) to the target eNB, after a handover has been performed.

There can be three types of IDC indications for resolving IDC interference issues:
(1) An IDC indication with initial information, in which the UE sends an IDC indication message with IDC assistance information (such as relating to the FDM and TDM solutions) to the eNB when the UE detects IDC interference.
(2) An IDC indication with IDC over, where the UE sends an IDC indication message with the IDC over indication when the UE no longer experiences IDC interference.
(3) An IDC indication with updated information, where the UE sends an IDC indication message with updated IDC assistance information to the eNB when the UE detects IDC interference.

eNB Operation

Figure 2:
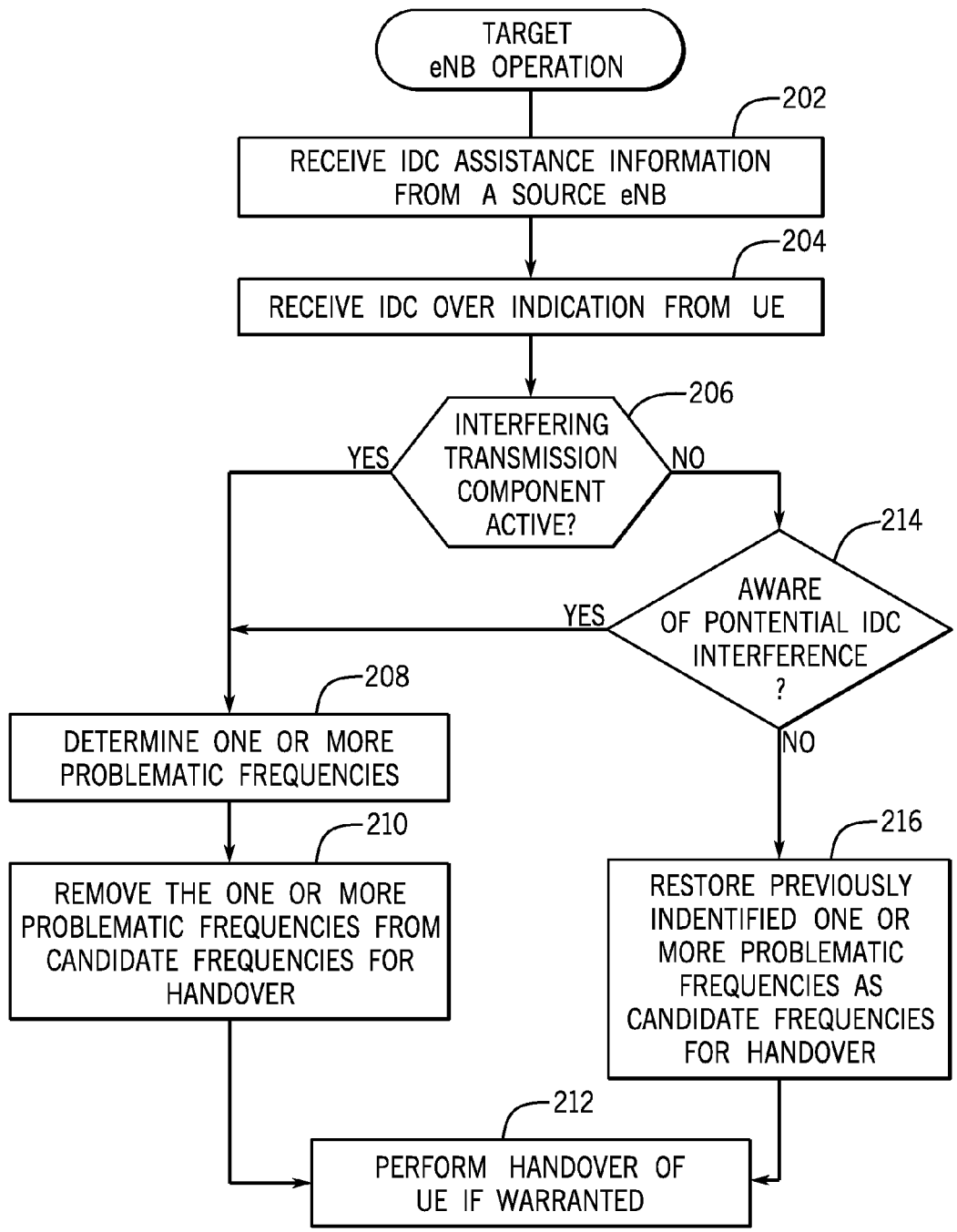
FIG. 2 is a flow diagram of a process relating to operation of a wireless access network node, in accordance with some implementations.

FIG. 2 is a flow diagram of a process performed by the target eNB 106 in accordance with some implementations. FIG. 2 assumes either Option 1 or 2 is used. The target eNB 106 receives (at 202) IDC assistance information from the source eNB 104, as part of a handover procedure. As noted above, the IDC assistance information may include a set of one or more unavailable frequencies that may potentially be subject to IDC interference at the UE 102.

In response to receiving (at 204) an IDC over indication, such as in an IDC indication message, the target eNB 106 determines (at 206) whether the interfering transmission component is still active. This can be determined based on the On-Off field (Option 1) received by the target eNB 106 from the UE 102, where the On-Off field is set to the first value to indicate that the interfering transmission component is active. Alternatively, the determination (at 206) can be based on presence or lack thereof of the On field (Option 2) in the IDC indication message.

If the target eNB 106 determines (at 206) that the interfering transmission component is active, the target eNB 106 does not initiate handover back to one or more problematic frequencies (as discussed above), even though the IDC indication message with IDC over indication was received (at 204).

The one or more problematic frequencies can be determined (at 208) by the target eNB 106 in various ways. If the IDC indication message containing the IDC over indication and the On-Off or On field does not include a set of one or more unavailable frequencies, then the target eNB 106 identifies the following frequency or frequencies as being problematic: (1) the set of one or more unavailable frequencies previously reported by the source eNB 104 to the target eNB 106; and (2) the frequency of the source eNB 104 used by the UE 102 prior to the handover. In response to the IDC indication message not including the set of one or more unavailable frequencies, the target eNB 106 keeps and re-uses the set of one or more unavailable frequencies previously received from the source eNB 104.

However, if the IDC indication message containing the IDC over indication and the On-Off or On field does include a set of one or more unavailable frequencies, then the target eNB 106 identifies as problematic the one or more unavailable frequencies included in the IDC indication message. In other words, the target eNB 106 can disregard the set of one or more unavailable frequencies previously reported by the source eNB 104 to the target eNB 106.

The target eNB 106 removes (at 210) the one or more problematic frequencies (determined at 206) from the candidate frequencies usable for handover of the UE 102. Next, the target eNB 106 performs (at 212) handover of the UE 102, when warranted, using the candidate frequencies identified at 210.

If the target eNB 106 determines (at 206) that the interfering transmission component is inactive (On-Off field set to the second value with Option 1, or lack of the On field in the IDC indication message with Option 2), then the target eNB 106 determines (at 214) whether the target eNB 106 is aware of any potential IDC interference issue with the UE 102. The target eNB 106 may become aware of a potential IDC interference issue if the target eNB 106 receives any information indicating that the interfering transmission component at the UE 102 may later be re-activated.

In the scenario where the target eNB 106 is aware a potential IDC interference for the UE 102, the target eNB identifies other one or more available frequencies which were not indicated as unavailable frequencies by the source eNB 104. Such identified one or more available frequencies can include those associated with a Reference Signal Received Power (RSRP) or Reference Signal Received Quality (RSRQ) that is in a specified acceptable range. Such identified one or more available frequencies are used to avoid unexpected IDC interference due to re-activation of the interfering transmission component. Thus, if the target eNB 106 is aware of potential IDC interference (as determined at 214), the target eNB 106 can determine (at 208) one or more problematic frequencies to include (1) the set of one or more unavailable frequencies previously reported by the source eNB 104 to the target eNB 106; and (2) the frequency of the source eNB 104 used by the UE 102 prior to the handover. Instead, the target eNB 106 uses the identified one or more available frequencies discussed above.

On the other hand, if the target eNB 106 is unaware of any potential IDC interference (as determined at 214), then the target eNB 106 can restore (at 216) the previously identified one or more problematic frequencies as part of candidate frequencies for handover. The target eNB 106 can then perform (at 212) handover of the UE 102 using the restored one or more frequencies, as well as other candidate frequencies.

In some implementations, after the target eNB 106 receives a message indicating that the interfering transmission component is active, if the target eNB 106 does not receive an indication that the interfering transmission component has become inactive, the target eNB 106 may send, after a specified elapsed time duration following the message indicating that the interfering transmission component is active, a query to the UE 102 to inquire about the status of the UE 102. The query can be signaled using an RRC message or a MAC CE. In response to the query, the UE 102 can indicate to the target eNB 106 the status (active or inactive) of the interfering transmission component.

Changes to 3GPP Specifications

The following describes example modifications that can be made to various 3GPP Specifications. It is noted that the modifications referenced herein may be applied to various other sections of the same 3GPP Specifications and/or other 3GPP Specifications as well. Although example modifications of various sections of 3GPP Specifications are provided below, it is noted that the 3GPP Specifications can be modified in different ways in other examples, but that such other modifications would still be consistent with and covered by the disclosure of the present application.

Section 23.4.2 of 3GPP TS 36.300 can be updated to include the following or similar language (underlined text indicates newly added text, while non-underlined text indicates existing text in the section):

> To assist the eNB in selecting an appropriate solution, all necessary/available assistance information for both FDM and TDM solutions is sent together in the IDC indication to the eNB. The IDC assistance information contains the list of E-UTRA carriers suffering from IDC problems, the direction of the interference and, depending on the scenario (see 3GPP TR 36.816), it also contains TDM patterns or parameters to enable appropriate DRX configuration for TDM solutions on the serving E-UTRA carrier. The IDC indication is also used to update the IDC assistance information, including for the cases when the UE no longer suffers from IDC problems. In case of inter-frequency handover offered by a FDM solution, the IDC over indication that the UE no longer suffers from IDC problems contains ISM On indication if ISM device is still active. In case of inter-eNB handover, the IDC assistance information is transferred from the source eNB to the target eNB.

Section 5.6.9.2 of 3GPP TS 36.331 can be updated to include the following or similar language (underlined text indicates newly added text, while non-underlined text indicates existing text in the section):

> A UE capable of providing IDC indications may initiate the procedure when it is configured to provide IDC indications and upon change of IDC problem information.
> Upon initiating the procedure, the UE shall:
> 1> if configured to provide IDC indications:
> 2> if the UE did not transmit an InDeviceCoexIndication message since it was configured to provide IDC indications:
> 3> if on one or more frequencies for which a measObjectEUTRA is configured, the UE is currently experiencing IDC problems that it cannot solve by itself:
> 4> initiate transmission of the InDeviceCoexIndication message in accordance with 5.6.9.3;
> 2> else:
> 3> if the set of frequencies, for which a measObjectEUTRA is configured and on which the UE is experiencing IDC problems that it cannot solve by itself, is different from the set indicated in the last transmitted InDeviceCoexIndication message; or
> 3> if the UE is not currently experiencing IDC problem that it cannot solve by itself and if the set of frequencies, for which a measObjectEUTRA is configured and on which the UE cannot solve by itself, is the same or different from the set indicated in the last transmitted InDeviceCoexIndication message; or
> 3> if for one or more of the frequencies in the previously reported set of frequencies, the interferenceDirection is different from the value indicated in the last transmitted InDeviceCoexIndication message; or
> 3> if the TDM assistance information is different from the assistance information included in the last transmitted InDeviceCoexIndication message:
> 4> initiate transmission of the InDeviceCoexIndication message in accordance with 5.6.9.3;

Section 5.6.9.3 of 3GPP TS 36.331 can be updated to include the following or similar language (underlined text indicates newly added text, while non-underlined text indicates existing text in the section):

> The UE shall set the contents of the InDeviceCoexIndication message as follows:
> 1> if there is at least one E-UTRA carrier frequency, for which a measurement object is configured, that is affected by IDC problems and the UE is currently experiencing IDC problems:
> 2> include the IE affectedCarrierFreqList with an entry for each affected E-UTRA carrier frequency for which a measurement object is configured;
> 2> for each E-UTRA carrier frequency included in the IE affectedCarrierFreqList, include interferenceDirection and set it accordingly;
> 2> include Time Domain Multiplexing (TDM) based assistance information:
> 3> if the UE has DRX related assistance information that could be used to resolve the IDC problems:
> 4> include drx-CycleLength, drx-Offset and drx-ActiveTime;
> 3> else (the UE has desired subframe reservation patterns related assistance information that could be used to resolve the IDC problems):
> 4> include idc-SubframePatternList;
> 1> If there is at least one E-UTRA carrier frequency, for which a measurement object is configured, that is affected by IDC problems and the UE is not currently experiencing IDC problems;
> 2> include ISMOnandication;

The InDeviceCoexIndication message provided in Section 6.2.2 of 3GPP TS 36.331 can be updated to include the following information elements:

```
ismOnIndication-r11               ISMOnIndication-r11
     OPTIONAL,
ISMOnIndication-r11 ::= SEQUENCE  {
    ismOn-r11                     ISMOn
}
```

The ISMOn information element indicates that the status of the ISM device is still active. When the target eNB receives ismOn indication, the target eNB may reuse affectedCarrierFreq previously reported.

System Architecture

Figure 3:
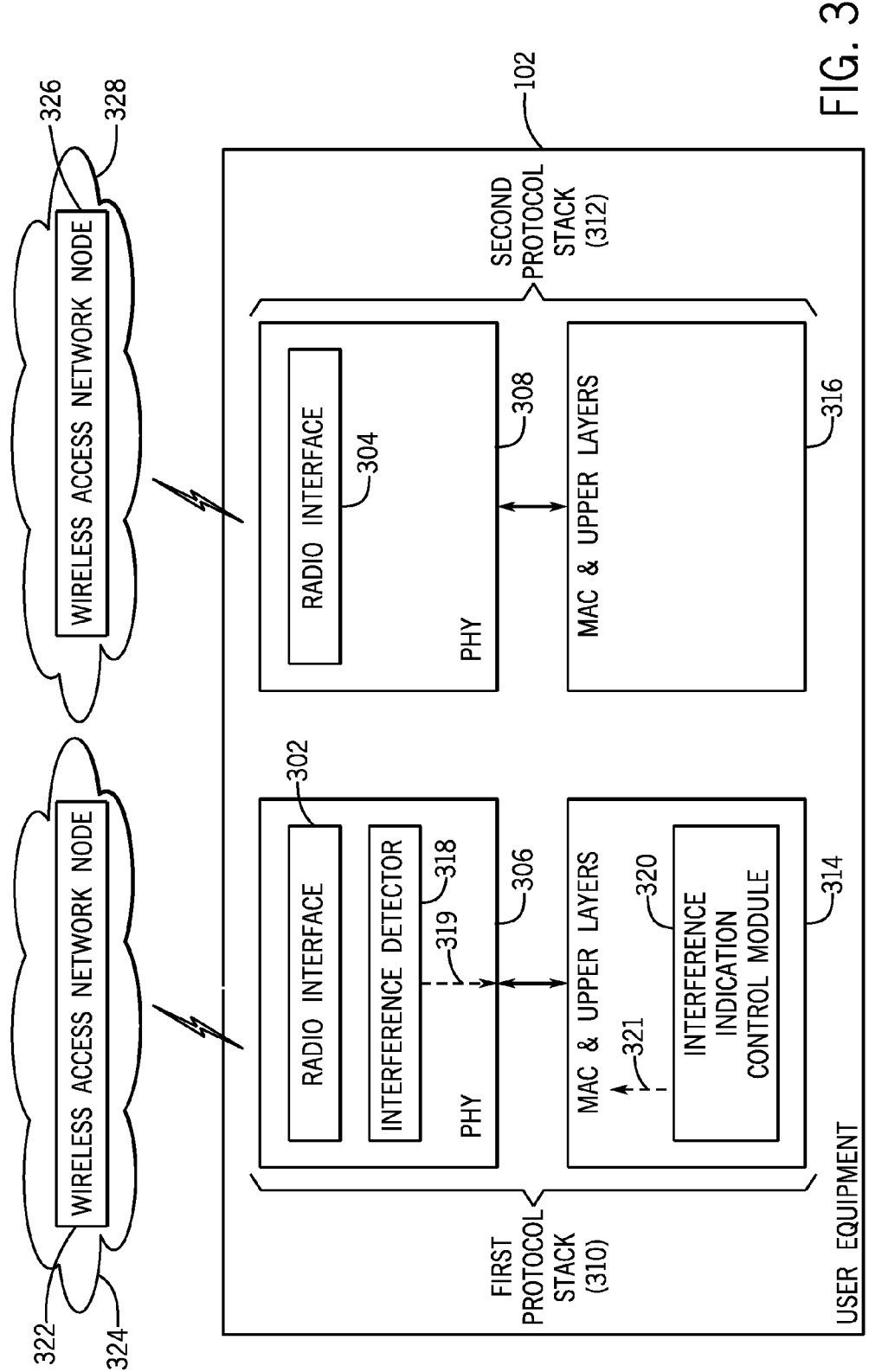
FIG. 3 is a block diagram of an example arrangement that includes a user equipment and wireless access network nodes, in accordance with some implementations.

FIG. 3 is a block diagram of an example arrangement that includes a UE 102, which can be a mobile telephone, a smartphone, a personal digital assistant (PDA), a tablet computer, a notebook computer, or any other type of electronic device that is capable of performing wireless communications. In the example of FIG. 3, the UE 102 can include two different types of radio interfaces 302 and 304 that operate according to corresponding different wireless technologies. Although just two radio interfaces 302, 304 are depicted in FIG. 3, it is noted that in alternative examples, there can be more than two different types of radio interfaces in the UE 102.

The radio interface 302 is able to wirelessly communicate with a wireless access network node 322 in a wireless access network 324, and the radio interface 304 is able to wirelessly communicate with another wireless access network node 326 in a wireless access network 328. Each radio interface 302 or 304 can be a radio transceiver that includes a transmitter to transmit RF signals, and a receiver to receive RF signals.

The radio interfaces 302 and 304 are part of respective protocol stacks 310 and 312. The first and second protocol stacks 310 and 312 form a communication subsystem of the UE 102, to allow the UE 102 to communicate with various external entities.

The first protocol stack 310 can include protocol layers for a first wireless technology, while the second protocol stack 312 can include protocol layers for a second, different wireless technology. As examples, the first protocol stack 310 can operate according to the E-UTRA technology, while the second protocol stack 312 can operate according to the ISM or GNSS technology.

In the foregoing example that includes an E-UTRA protocol stack 310, the wireless access network node 322 can be an evolved node B (eNB) according to the E-UTRA technology. An eNB can include functionalities of a base station and a radio network controller.

If the second protocol stack 312 operates according to the ISM technology, then the wireless access network node 326 in the wireless access network 328 can be a WiFi wireless access point, a Bluetooth master device, or some other type of wireless access point or base station. On the other hand, if the second protocol stack 312 operates according to the GNSS technology, then the wireless access network node 326 can be a satellite.

In the ensuing discussion, it is assumed that the first protocol stack 310 is an E-UTRA protocol stack, and the wireless access network node 322 is an eNB. However, it is noted that techniques or mechanisms according to some implementations can be applied to other wireless technologies.

The E-UTRA protocol stack 310 includes a physical layer 306 (that includes the radio interface 302) and higher layers 314 that include a medium access control (MAC) layer and upper layers. The physical layer 306 can be considered the lowest layer in the first protocol stack 310. The second protocol stack 312 includes a physical layer 308 (that includes the radio interface 304) and higher layers 316 that include a MAC layer and upper layers.

Generally, a MAC layer can provide addressing and channel access control mechanisms to allow the UE 102 to communicate over a shared medium, in this case a shared wireless medium. In some implementations, the upper layers of the LTE protocol stack 310 can include an RRC layer, as described in 3GPP Technical Specification (TS) TS 36.331. The upper layers can further include other protocol layers. The RRC protocol can define functionality associated with assignment, configuration, and release of radio resources between the UE 102 and the wireless access network node. Although reference is made to an RRC layer in the discussed examples, it is noted that in other examples, the upper layers can include alternative upper layers.

The upper layers that are included in the second protocol stack 312 depend on the wireless technology implemented by the second protocol stack 312.

As depicted in FIG. 3, the physical layer 306 further includes an interference detector 318. The interference detector 318 is able to detect IDC interference, such as IDC interference at a receiver of the radio interface 302 caused by transmission by a transmitter in the radio interface 304. In some examples, the transmitter of the radio interface 304 is the interfering transmission component discussed above.

In further examples, the interference detector 318 may also be able to detect IDC interference at a receiver of the radio interface 304 caused by transmission by a transmitter of the radio interface 302. In such further examples, the interfering transmission component discussed above would be the transmitter of the radio interface 302. In yet further examples, another interference detector (not shown) may also be provided in the physical layer 308 of the second protocol stack 312 to detect IDC interference at the receiver of the radio interface 304 caused by transmission by the transmitter of the radio interface 302.

Various techniques can be used for detecting IDC interference in a UE. Examples of several techniques are described in U.S. application Ser. No. 13/069,751, entitled "Method and Apparatus for Interference Identification on Configuration of LTE and BT," filed Mar. 23, 2011, now U.S. Pat. No. 8,547,867.

In some examples, detection of IDC interference can be based on measurements at a radio receiver in the presence of transmissions from a radio transmitter. In alternative implementations, rather than performing detection of IDC interference based on measurements, IDC interference detection by the interference detector 318 can instead be based on internal coordination between the radio interfaces of the UE 102.

Upon detecting IDC interference and determining that the IDC interference satisfies one or more specified criteria (such as discussed above for uniform and non-uniform traffic patterns), the interference detector 318 can activate an interference notification 319 that is provided to an interference indication control module 320. The interference indication control module 320 can be provided in one of the higher layers 314. In alternative examples, the interference indication control module 320 can also be provided in the physical layer 306.

The interference indication control module 320 can respond to the interference notification 319 from the interference detector 318 by generating an IDC indication 321 that is to be transmitted from the UE 102 to a corresponding wireless access network node.

In this discussion, although reference is made to the E-UTRA protocol stack 310 sending an IDC indication to the wireless access network node, it is noted that in other implementations, the second protocol stack 312 can also include a mechanism to detect IDC interference and to send an IDC indication to the corresponding wireless access network node 326. Moreover, although reference is made to specific indications, messages, and procedures that may be according to the E-UTRA technology, it is noted that in alternative implementations, techniques or mechanisms as discussed can be applied also to other technologies for handling of IDC interference between radio interfaces of a UE.

Figure 4:
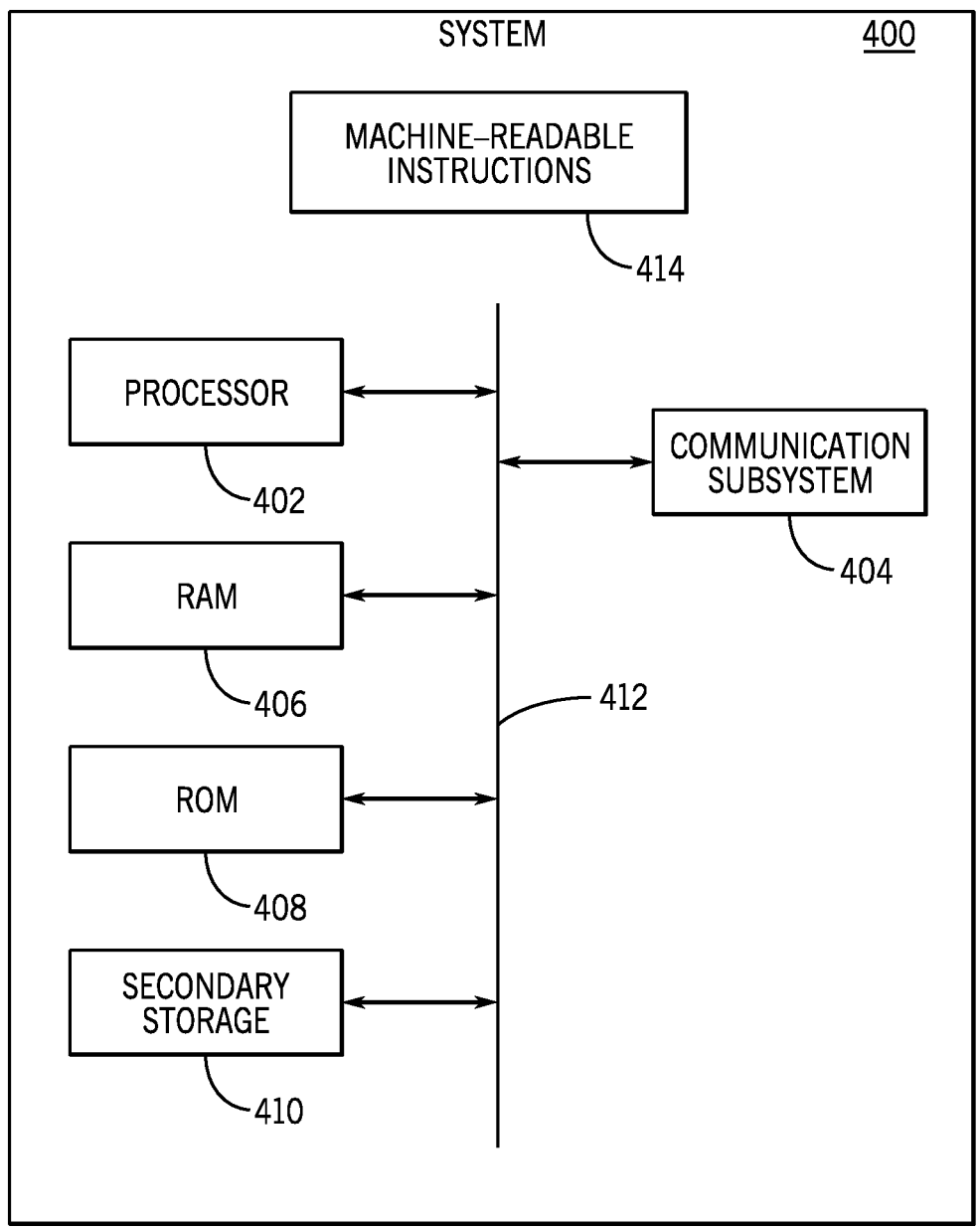
FIG. 4 is a block diagram of an example system that incorporates some implementations.

FIG. 4 illustrates an example system 400, which can either be the UE 102 or a wireless access network node, such as 322 or 326 in FIG. 3. The system 400 can include a processor (or multiple processors) 402. A processor can include a microprocessor, microcontroller, processor module or subsystem, programmable integrated circuit, programmable gate array, or another control or computing device.

The system 400 can include a communication subsystem 404 to communicate over a wireless link. The system 400 can also include various storage media, including a random access memory (RAM) 406 (e.g. dynamic RAM or static RAM), read-only memory (ROM) 408 (e.g. erasable and programmable read-only memory (EPROM), electrically erasable and programmable read-only memory (EEPROM), or flash memory), and secondary storage 410 (e.g. magnetic or optical disk-based storage), and so forth. The various components can communicate with each other over one or more buses 412.

Machine-readable instructions 414 in the system 400 are executable on the processor(s) 402 to perform various tasks discussed above, either in the UE 400 or in a wireless access network node. The machine-readable instructions 414 can be stored in any of the various storage media of the system 400.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
   detecting, by a user equipment (UE), that the UE is no longer experiencing in-device coexistence (IDC) interference; and
   sending, by the UE to a wireless access network node, a message including:
   an IDC over indication indicating that the IDC interference caused by a transmission component in the UE is over, and
   an indication indicating that the transmission component is active.

2. The method of claim 1, wherein the indication indicating that the transmission component is active is an on-off field set to a first value to indicate that the transmission component is active, and wherein the on-off field is settable to a second, different value to indicate that the transmission component is inactive.

3. The method of claim 1, wherein the indication indicating that the transmission component is active is a field included in the message, the method further comprising:
   detecting, by the UE, that the transmission component has become inactive; and
   in response to the detecting that the transmission component has become inactive, sending, by the UE to the wireless access network node, another message without the field and a set of one or more unavailable frequencies to indicate that the transmission component is inactive.

4. The method of claim 1, further comprising:
   detecting, by the UE, that the IDC interference that was previously present is currently no longer present;
   detecting, by the UE, that the transmission component that caused the IDC interference is still active, wherein sending the message including the IDC over indication and the indication indicating that the transmission component is active is in response to the detecting that the IDC interference that was previously present is currently no longer present, and the detecting that the transmission component that caused the IDC interference is still active.

5. The method of claim 4, further comprising:
   detecting, by the UE, that the transmission component is inactive; and
   sending, by the UE to the wireless access network node, a further message to indicate that the transmission component is inactive.

6. The method of claim 5, wherein the indication indicating that the transmission component is active is an on-off field set to a first value, the method further comprising:
   including the on-off field in the further message, the on-off field in the further message being set to a second value to indicate that the transmission component is inactive.

7. The method of claim 5, wherein the indication indicating that the transmission component is active is an on field, the method further comprising:
   omitting the on field and a set of one or more unavailable frequencies from the further message, the omission of the on field and the set of one or more unavailable frequencies in the further message being an indication that the transmission component is inactive.

8. The method of claim 1, wherein the wireless access network node is a target wireless access network node, the method further comprising:
   performing, by the UE, a handover procedure to handover the UE from a source wireless access network node to the target wireless access network node,
   wherein sending the message is performed after the handover procedure.

9. The method of claim 8, further comprising:
   receiving, by the UE from the source wireless access network node, a frequency division multiplexing (FDM) solution for addressing the IDC interference, wherein the handover procedure is an inter-frequency handover procedure according to the FDM solution that causes the handover from the source wireless access network node to the target wireless access network node, and wherein IDC assistance information is transferred from the source wireless access network node to the target wireless access network node as part of the handover procedure.

10. The method of claim 1, wherein sending the message comprises sending a message selected from among:
    an IDC indication message;
    an existing uplink Radio Resource Control (RRC) message;
    a new uplink RRC message;
    an existing Medium Access Control (MAC) control element; and
    a new MAC control element.

11. The method of claim 1, wherein the message is configurable to include or not to include a set of one or more unavailable frequencies, the one or more unavailable frequencies potentially subject to the IDC interference.

12. A wireless access network node comprising:
a communication interface to communicate with a user equipment (UE); and
at least one processor configured to:
receive, from the UE, a message including:
an in-device coexistence (IDC) over indication indicating that IDC interference caused by a transmission component has been resolved,
a separate indication indicating that the transmission component is still active even though the IDC interference caused by the transmission component has been resolved; and
determine, based on the message, that the IDC interference at the UE has been resolved, but the transmission component in the UE that caused the interference in the UE is still active.

13. The wireless access network node of claim 12, wherein the message includes an on-off field set to a value to indicate that the transmission component in the UE is active, and wherein the on-off field is settable to a different value to indicate that the transmission component in the UE is inactive.

14. The wireless access network node of claim 12, wherein the message includes a field, wherein the including of the field indicates that the transmission component in the UE is active, and wherein omission of the field in a message indicates that the transmission component in the UE is inactive.

15. The wireless access network node of claim 12, wherein the at least one processor is configured to:
in response to the determining based on the message that the transmission component is still active, control handover of the UE that prevents handover to a set of one or more unavailable frequencies identified as potentially affected by the IDC interference even though the message indicates that the IDC interference has been resolved.

16. The wireless access network node of claim 15, wherein the set of one or more unavailable frequencies is included in the message.

17. The wireless access network node of claim 15, wherein the set of one or more unavailable frequencies was previously received from another wireless access network node that served the UE prior to a handover of the UE, and wherein the at least one processor is configured to:
keep and re-use the set of one or more unavailable frequencies previously received from the another wireless access network node in response to determining that the message does not contain one or more unavailable frequencies.

18. The wireless access network node of claim 12, wherein the at least one processor is configured to further:
control handover of the UE that prevents handover to a set of one or more unavailable frequencies identified as potentially affected by the IDC interference, in response to the wireless access network node being aware of potential IDC interference due to reactivation of the transmission component.

19. The wireless access network node of claim 12, wherein the at least one processor is configured to further:
send a message containing a solution to the IDC interference to the UE.

20. A user equipment (UE) comprising:
a communication interface to communicate with a wireless access network node; and
at least one processor configured to:
perform a handover procedure to address in-device coexistence (IDC) interference at the UE;
after the handover procedure, detect that the IDC interference that was previously present is currently no longer present;
detect that a transmission component that caused the IDC interference is still active,
in response to the detecting that the IDC interference is currently no longer present and the detecting that the transmission component is still active, send, to the wireless access network node, a message including an IDC over indication and a separate indication indicating that the transmission component is active, wherein the IDC over indication is to indicate that the IDC interference is over at the UE.

21. The UE of claim 20, wherein the at least one processor is configured to further:
in response to determining that the transmission component is inactive, send a further message to the wireless access network node, the further message indicating that the transmission component is inactive.

* * * * *